(12) United States Patent
Xia et al.

(10) Patent No.: US 9,791,633 B2
(45) Date of Patent: Oct. 17, 2017

(54) OPTICAL INTERFACE WITH TRAFFIC PROTECTION USING MULTI-OPTICAL PATH PHOTONIC SWITCH

(71) Applicant: Verizon Patent and Licensing Inc., Arlington, VA (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/215,698

(22) Filed: Jul. 21, 2016

(65) Prior Publication Data
US 2016/0327752 A1 Nov. 10, 2016

Related U.S. Application Data

(63) Continuation of application No. 14/583,917, filed on Dec. 29, 2014, now Pat. No. 9,417,395.

(51) Int. Cl.
*G02B 6/35* (2006.01)
*G02B 6/36* (2006.01)

(52) U.S. Cl.
CPC ......... *G02B 6/3508* (2013.01); *G02B 6/3546* (2013.01); *G02B 6/3556* (2013.01); *G02B 6/3562* (2013.01); *G02B 6/3652* (2013.01); *G02B 6/359* (2013.01); *G02B 6/3628* (2013.01)

(58) Field of Classification Search
None
See application file for complete search history.

(56) References Cited

U.S. PATENT DOCUMENTS

| | | | |
|---|---|---|---|
| 4,407,562 A | 10/1983 | Young | |
| 4,699,457 A | 10/1987 | Goodman | |
| 4,909,590 A | 3/1990 | Kamiko et al. | |
| 5,201,016 A | 4/1993 | Jinbo et al. | |
| 5,418,872 A | 5/1995 | Osaka et al. | |
| 5,461,683 A | 10/1995 | Harman | |
| 5,606,635 A | 2/1997 | Haake | |
| 5,864,643 A | 1/1999 | Pan | |
| 6,718,084 B1 | 4/2004 | Wang | |
| 8,929,695 B1 | 1/2015 | Gattass et al. | |
| 2002/0181841 A1 | 12/2002 | Lemoff et al. | |
| 2004/0184709 A1 | 9/2004 | Kubby et al. | |
| 2013/0077914 A1 | 3/2013 | Durrant et al. | |

FOREIGN PATENT DOCUMENTS

JP 2530330 9/1996
WO 2011/086400 7/2011

*Primary Examiner* — Mike Stahl

(57) ABSTRACT

An optical path system includes a first block that further includes multiple first fiber optic guides, arranged in a first configuration to receive multiple first optical fibers, with one fiber in each guide. The optical path system further includes a second block comprising multiple second fiber optic guides, arranged in a second configuration to receive multiple second optical fibers, with one fiber in each guide, wherein a first face of the second block abuts a first face of the first block and wherein the first block is movable relative to the second block. The optical path system also includes micro-position adjusting mechanisms configured to move the first block relative to the second block to align the multiple first optical fibers with the multiple second optical fibers.

20 Claims, 15 Drawing Sheets

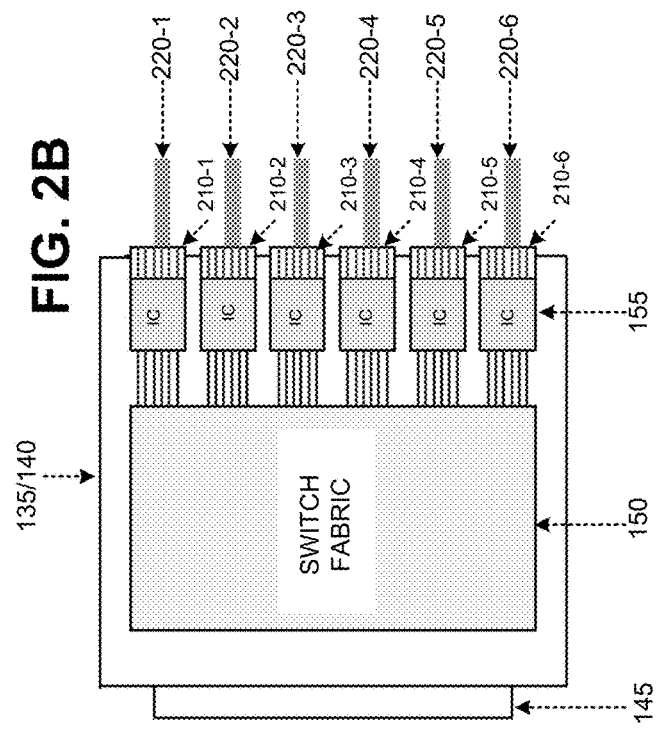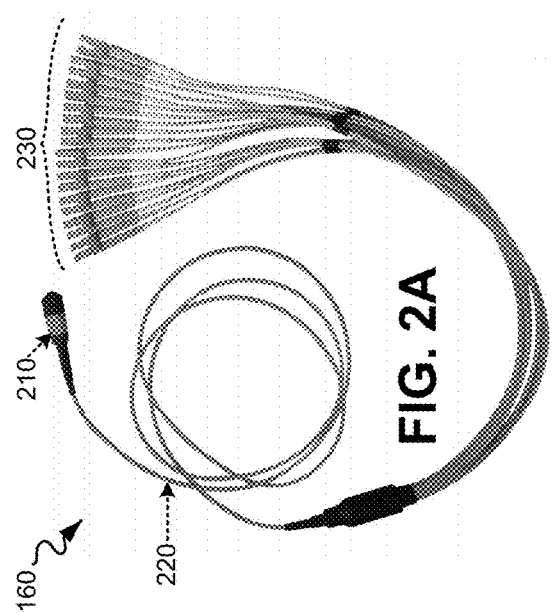

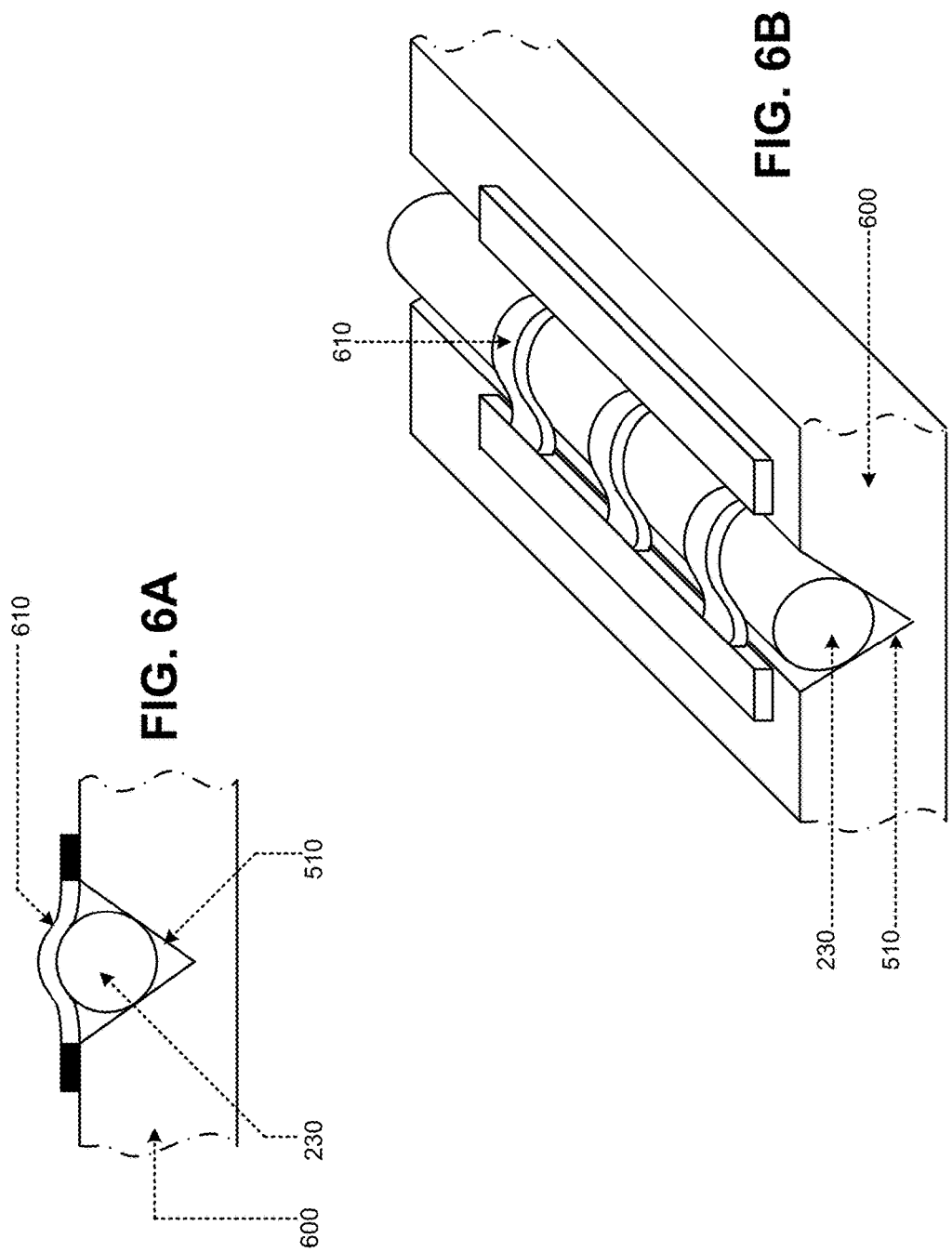

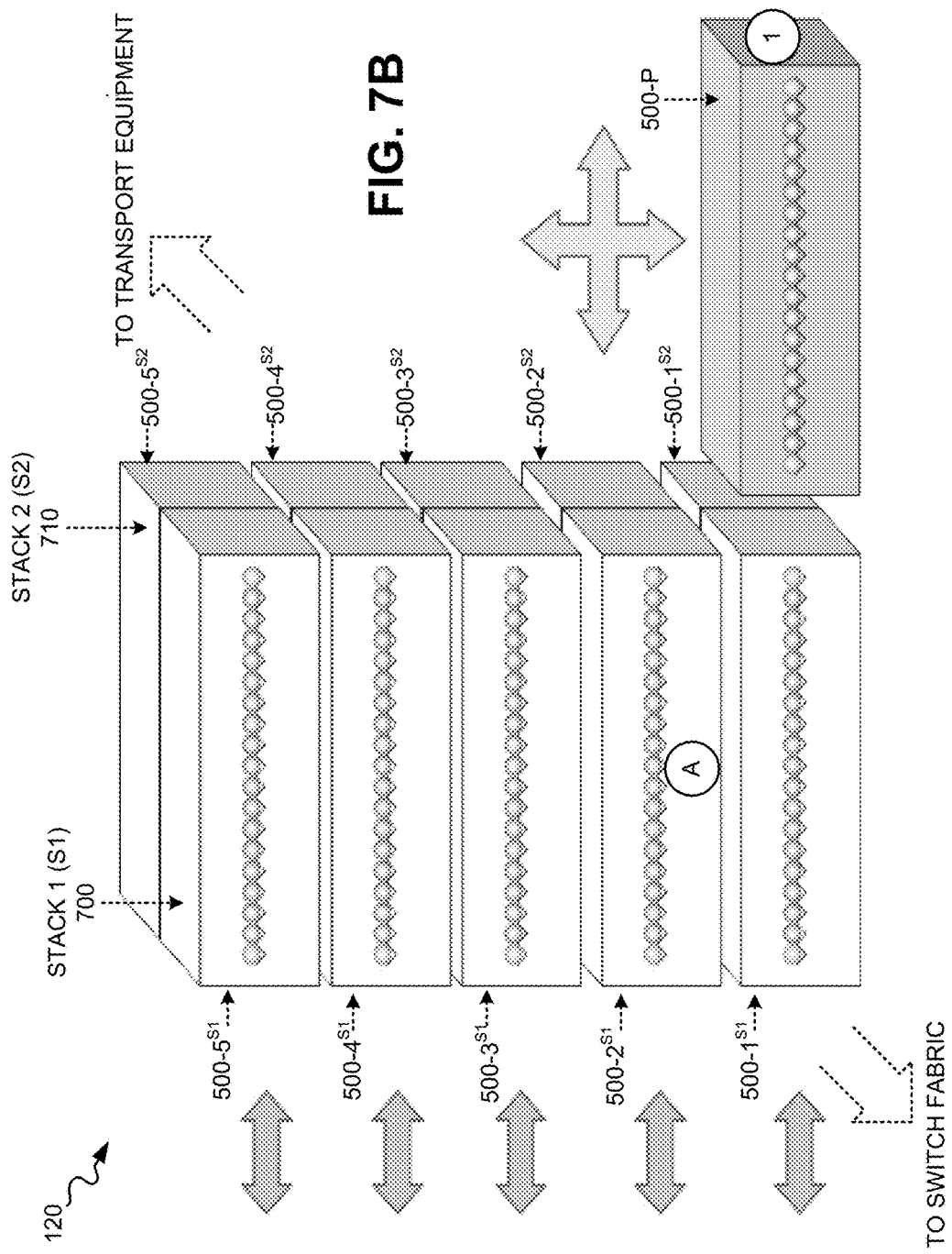

OPTICAL INTERFACE WITH TRAFFIC PROTECTION USING MULTI-OPTICAL PATH PHOTONIC SWITCH

RELATED APPLICATION

The present application is a continuation of, and claims priority from, U.S. application Ser. No. 14/583,971 entitled "Optical Interface With Traffic Protection Using Multi-Optical Path Photonic Switch" filed Dec. 29, 2014, the contents of which are hereby incorporated by reference herein in their entirety.

BACKGROUND

An optical switch is a switch that selectively switches signals in optical fibers or integrated optical circuits (IOCs) from one circuit to another. An optical switch that performs the switching by routing light beams is called a "photonic" switch regardless of how the light itself is switched.

A photonic switch changes circuit connections purely at the optical layer, with no electrical conversion and processing being involved. Since there is no optical-to-electrical and electrical-to-optical conversion, a photonic switch is agnostic from the standpoint of circuit rate, data format and optical wavelength. The switching mechanisms of existing photonic switches have involved switching only a single optical path, and not switching multiple optical paths simultaneously.

BRIEF DESCRIPTION OF THE DRAWINGS

FIGS. 2A and 2B are diagrams that depict details of the multi-fiber connector assembly of FIG. 1A and its interconnection with a switch fabric card of the switch fabric cards of FIG. 1A;

FIGS. 6A and 6B are diagrams that depict further details of an individual V-groove optical fiber guide of the optical block of FIGS. 5A and 5B;

FIG. 7B is a diagram that depicts a top view of the multi-path optical switch of FIG. 1A;

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

In embodiments described herein, a multi-optical path photonic switch includes a first plurality of optical fibers mated with a second plurality of optical fibers on a single-fiber-to-single-fiber basis, where the photonic switch switches the connections of all of the first plurality of optical fibers simultaneously. The embodiments described herein further include alignment mechanisms for accurately aligning mated optical fibers to ensure optimal optical transmission across each fiber-to-fiber interface. The multi-optical path photonic switch may be used, in conjunction with a switch fabric protection card, to provide traffic protection when there is a failure in a switch fabric card of a transport node.

Figure 1A:
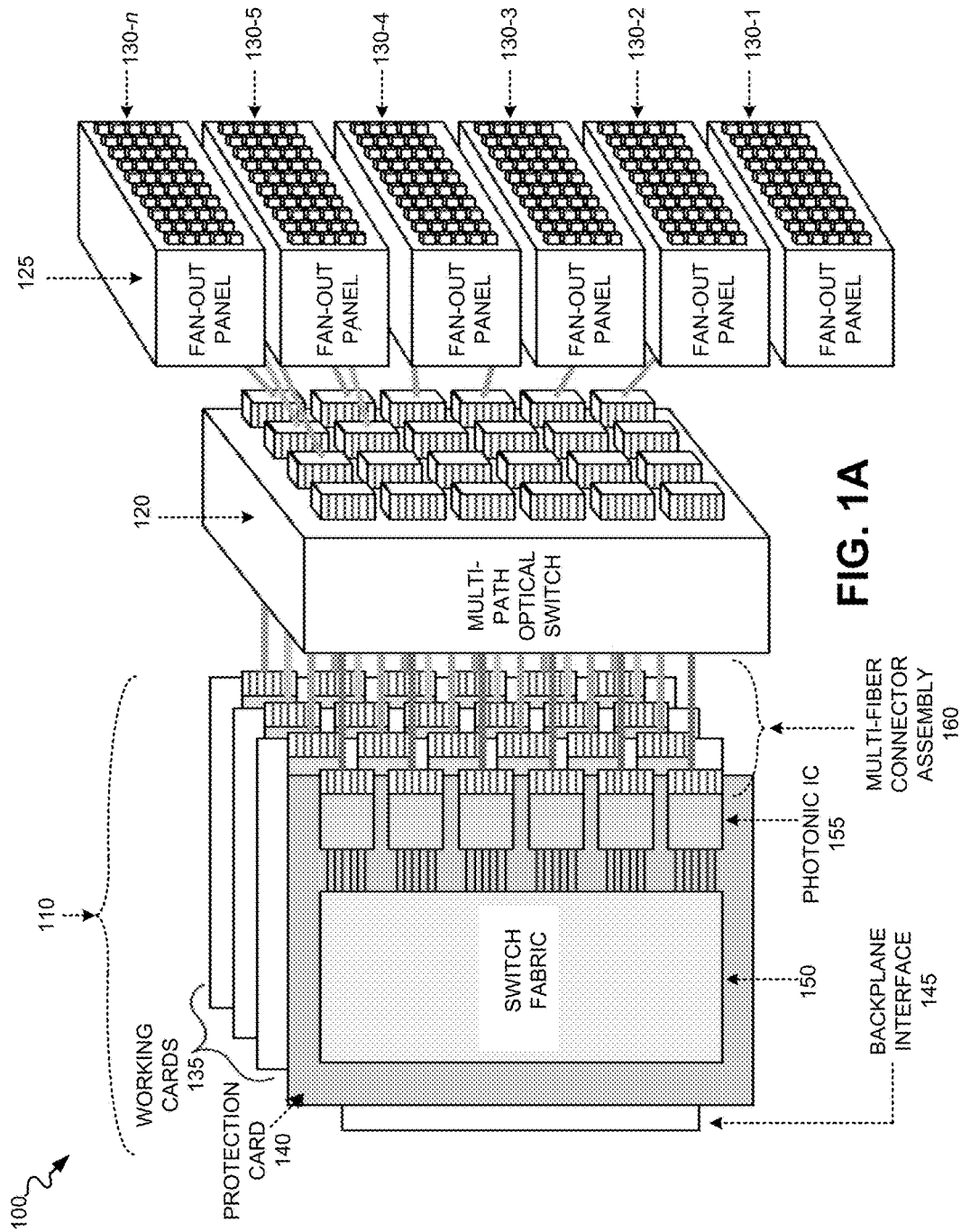
FIGS. 1A and 1B are diagrams that depict exemplary components of a transport node that includes a multi-path optical switch for switching optical connections between a switch fabric and transport equipment.
Figure 1B:
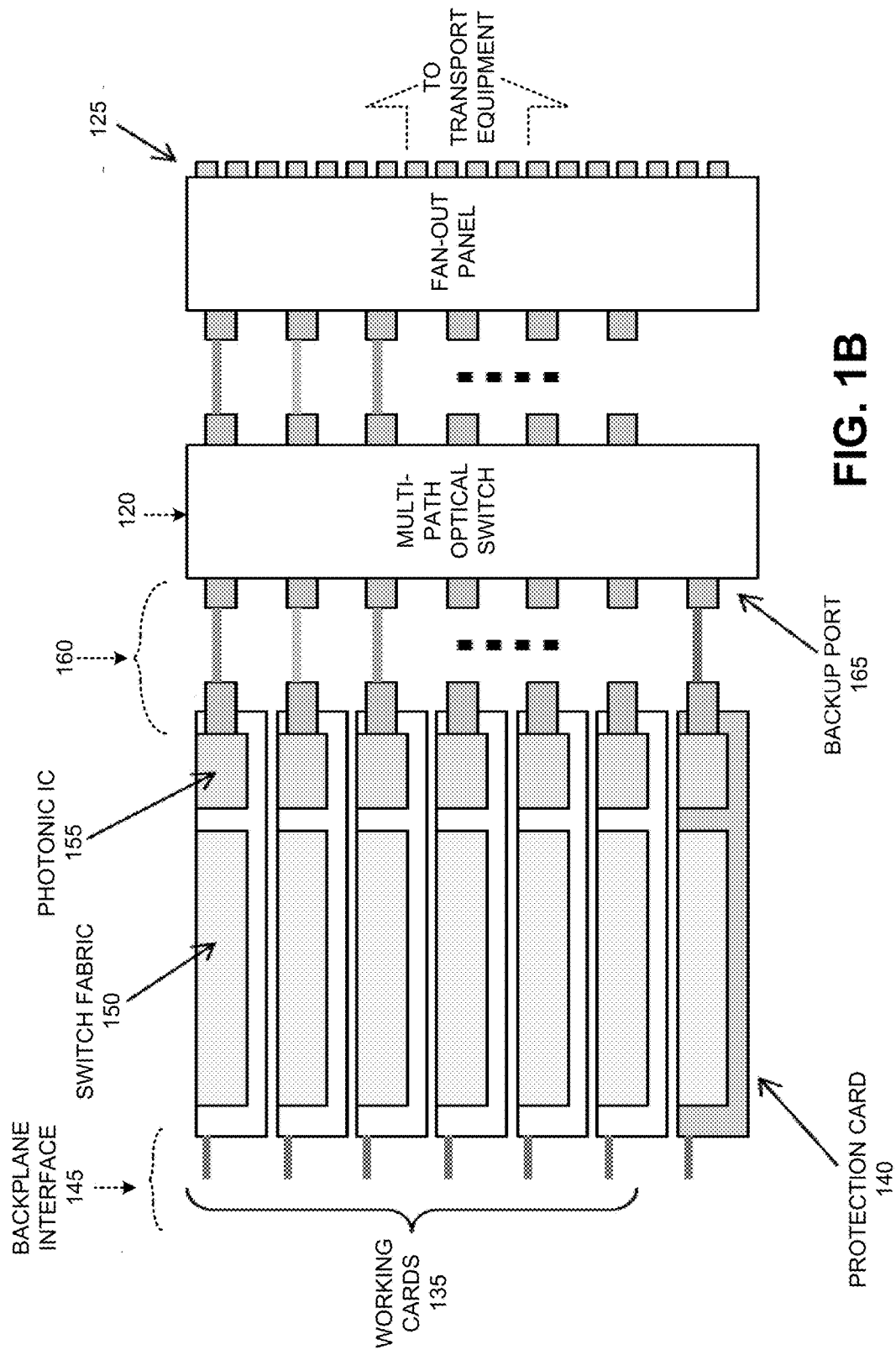

FIGS. 1A and 1B depict exemplary components of a transport node 100 that includes a multi-path optical switch for switching optical connections between a switch fabric and transport equipment. As shown in FIG. 1A, transport node 100 includes switch fabric cards 110, a multi-path optical switch 120, and a stack 125 of fan-out panels.

Switch fabric cards 110 includes multiple cards having switch fabrics and optical interfaces, including multiple working cards 135 and a protection card 140 interconnected with one another via a backplane interface 145. Working cards 135 includes multiple cards for switching data via switch fabrics, converting the switched data from electrical to optical signals, and sending the optical signals out via optical interfaces to multi-path optical switch 120. Protection card 140 includes one or more back up cards for receiving switched data from a failed one of working cards 135, converting the switched data from electrical to optical signals, and sending the optical signals out a backup port 165 (FIG. 1B) to multi-path optical switch 120. Optical switch 120 switches the optical signals via an optical path to fan-out panel stack 125.

Each card of switch fabric cards 110 includes a switch fabric 150, a photonic integrated circuit (IC) 155, and a multi-fiber connector assembly 160 for interconnecting photonic IC 155 with multi-path optical switch 120. Each photonic IC 155 and multi-fiber connector assembly 160 comprises a single optical interface of switch fabric card 110. Switch fabric 150 may include one or more switching planes to facilitate the switching of incoming and outgoing data to/from transport node 100. In one exemplary implementation, each of the switching planes may include a three-stage switch of crossbar elements. Other types of switching planes may, however, be used in switch fabric 150.

Photonic IC 150 may include high density integrated optics that convert data, in electrical form, received via switch fabric 150, to output optical data for transmission over an optical path via multi-fiber connector assembly 160 and optical switch 120. Multi-fiber connector assembly 160 may, for example, include a multi-fiber Push On (MPO) connector that can support 8-16 independent optical connections.

Multi-path optical switch 120 switches optical signals received from switch fabric cards 110 via a fiber path to fan-out panel stack 125. Optical switch 120 switches the optical signals as described in further detail below with respect to FIGS. 5A-11B.

Fan-out panel stack 125 includes multiple fan out panels 130-1 through 130-*n* (generically and individually referred to herein as "fan out panel 130"). Each fan-out panel 130 includes input fiber ports from optical switch 120 that each "fan-out" to one or more single fiber output ports that connect to, for example, individual transport equipment (not shown). Each fan-out panel 130, therefore, includes an array of output single fiber ports for connection to transport equipment that further connects to an optical network (not shown).

Though not shown in FIGS. 1A and 1B, transport node 100 may additionally include a control unit for controlling the path switching of multi-path optical switch 120. In one implementation, the control unit may include a processing unit, and one or more memory devices or storage devices. The processing unit may include one or more processors or microprocessors, or processing logic, which interprets and executes instructions. The one or more memory devices or storage devices may include random access memory (RAM) or another type of dynamic storage device that stores information and instructions for execution by the processing unit, Read Only Memory (ROM) or another type of static storage device that stores static information and instructions for use by the processing unit, or a magnetic and/or optical recording medium. The one or more memory devices or storage devices may each be referred to as a "tangible non-transient computer-readable medium."

The configuration of components of transport node 100 shown in FIGS. 1A and 1B is for illustrative purposes. Other configurations may be implemented. Therefore, transport node 100 may include additional, fewer and/or different components, that may be configured in a different arrangement, than that depicted in FIGS. 1A and 1B.

FIGS. 2A and 2B depict details of multi-fiber connector assembly 160 and its interconnection with a switch fabric card 135/140 of switch fabric cards 110. As shown in FIG. 2A, multi-fiber assembly 160 includes a connector 210, and a cable section 220 that branches into multiple individual optical fibers 230.

As further shown in FIG. 2B, a switch fabric 150 of a switch fabric card 135/140 may connect to multiple photonic ICs 155 that each acts as an electrical-to-optical interface for converting data switched through switch fabric 150 to output optical signals for transmission via a respective multi-fiber connector assembly 160. As depicted in FIG. 2B, an output of each photonic IC 155 may connect to a respective connector 210-1 through 210-6 of a multi-fiber connector assembly. Optical signals received at each connector 210-1 through 210-6 from a photonic IC 155 are transferred via cable section 220 and individual optical fibers 230 to multi-path optical switch 120.

Figure 3:
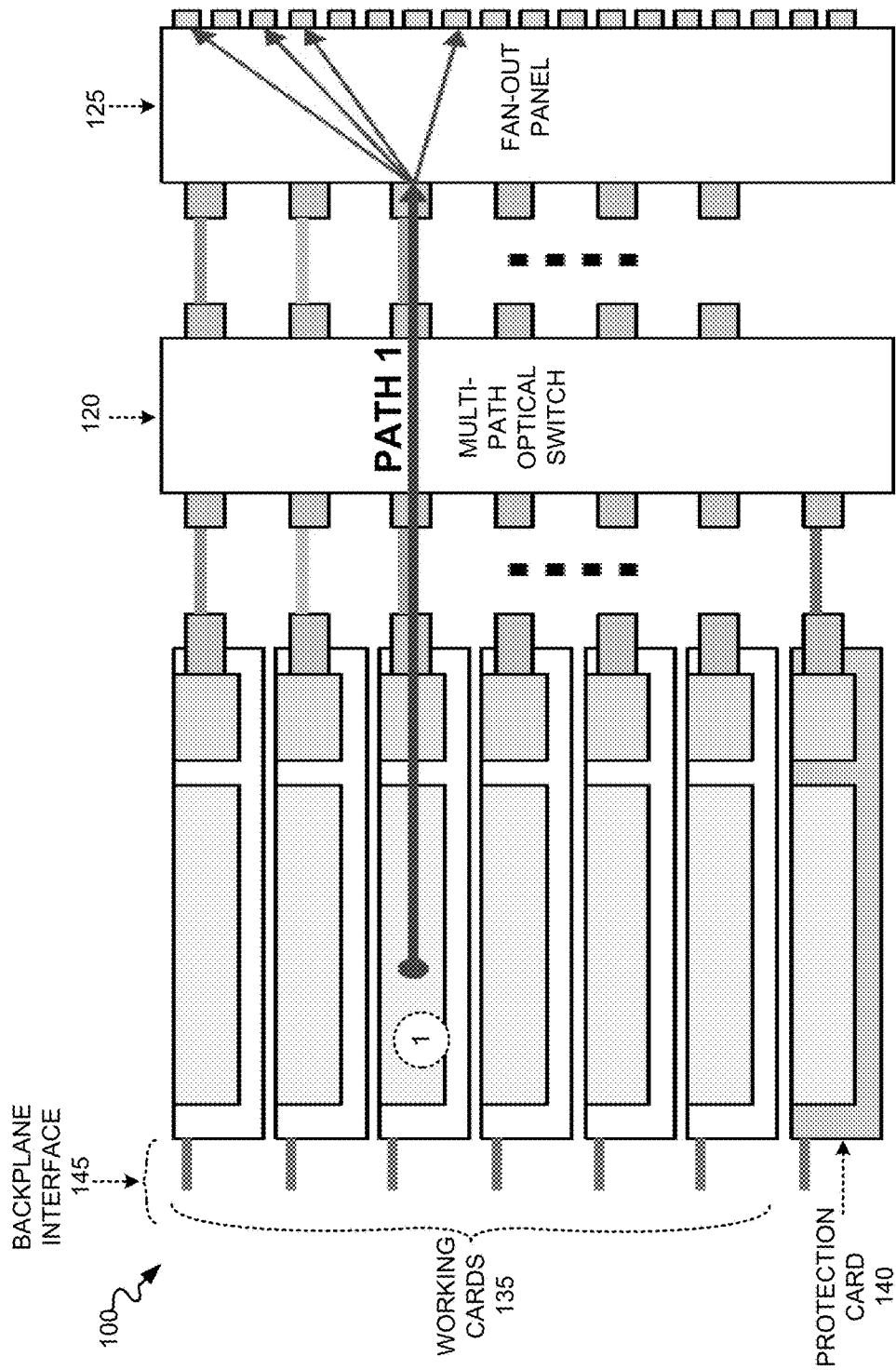
FIGS. 3 and 4 depict, respectively, a high level operation of the multi-path optical switch of FIG. 1A in switching optical signals sent from a switch fabric card via a first path when the switch fabric card is working normally, and via a backup second path when the switch fabric card fails.
Figure 4:
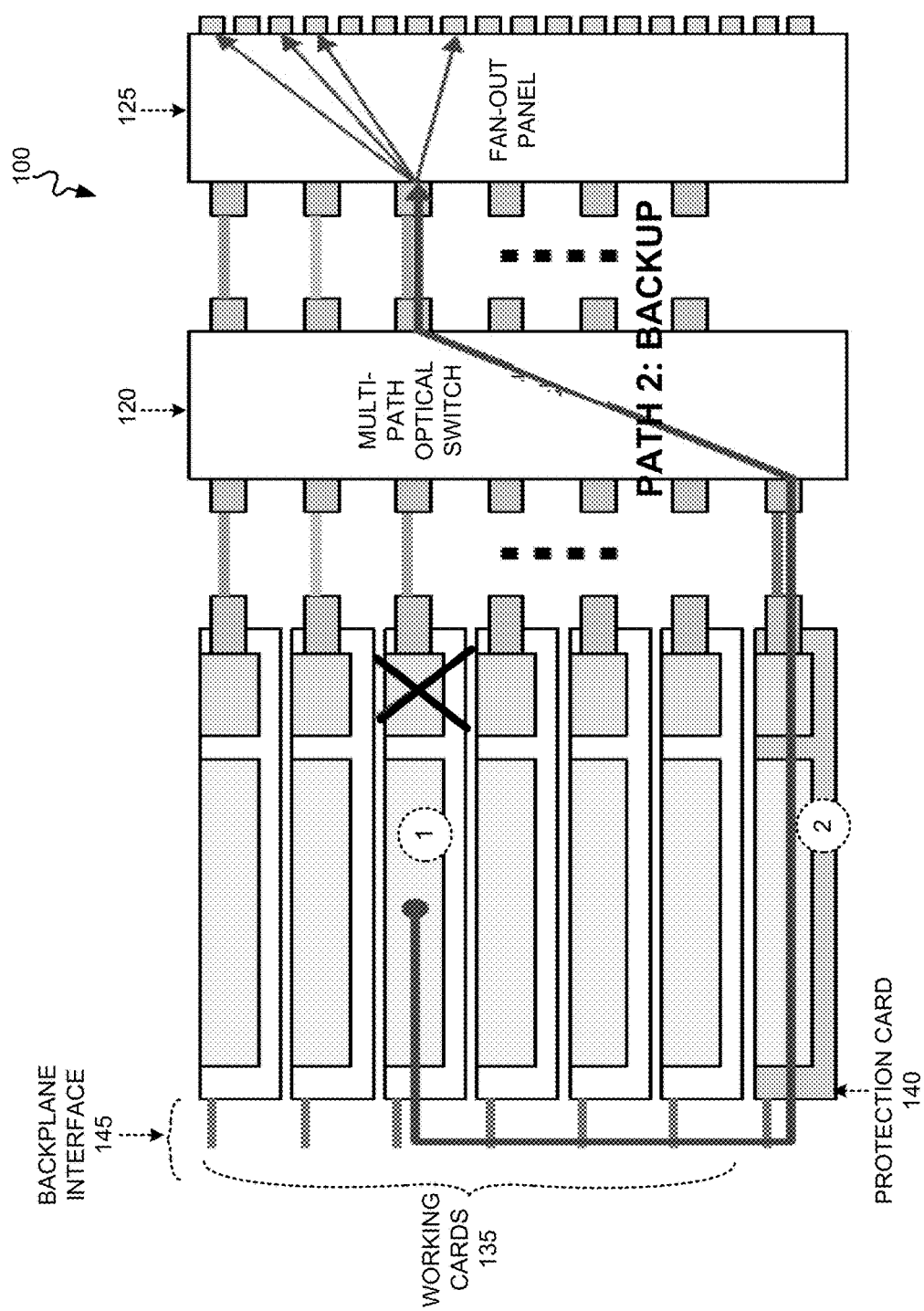

FIGS. 3 and 4 depict a high level operation of multi-path optical switch 120 in switching optical signals sent from a switch fabric card 110 of working cards 135 via a first path (PATH 1) when the switch fabric card 110 is working normally, and via a backup second path (PATH 2) when any component of the switch fabric card fails. Multi-path optical switch 120, therefore, switches optical traffic normally handled by one of working cards 135 that has failed via a backup protection card and an alternate backup path through optical switch 120.

FIG. 3 depicts an example of the normal operation of transport node 100 when switching optical signals from a switch fabric card (identified by a "1" within a circle) of working cards 135 through a switched path (PATH 1) of optical switch 120 to a fan-out panel of fan-out panel stack 125. The fan-out panel further connects optical signals received via the switched path (PATH 1) to one or more individual fiber outputs connected to transport equipment. Multi-path optical switch 120 switches optical signals through the switched path (PATH 1) as described in further detail below with respect to FIGS. 5A-10.

FIG. 4 depicts an example of the operation of transport node 100 when switching optical signals from a switch fabric card (identified by a "1" within a circle) of working cards 135 when some component of the switch fabric card fails. In the example of FIG. 4, the photonic IC of the switch fabric card is shown as failing by the large superimposed "X." In the event of a failure of the photonic IC, the switch fabric of the switch fabric card re-routes the optical traffic from the switch fabric card through backplane interface 145 to protection card 140 (identified by a "2" within a circle). At the same time, multi-path optical switch 120 switches the optical traffic through optical switch 120, via the backup PATH 2, such that it is connected to the same input connections on fan-out panel stack 125 as original PATH 1 (FIG. 3). The optical traffic, therefore, reaches the same individual transport equipment as the previous path through optical switch 120 (PATH 1). Multi-path optical switch 120 switches optical signals from protection card 140 through the switched path (PATH 2) as described in further detail below with respect to FIG. 8.

Figure 5A:
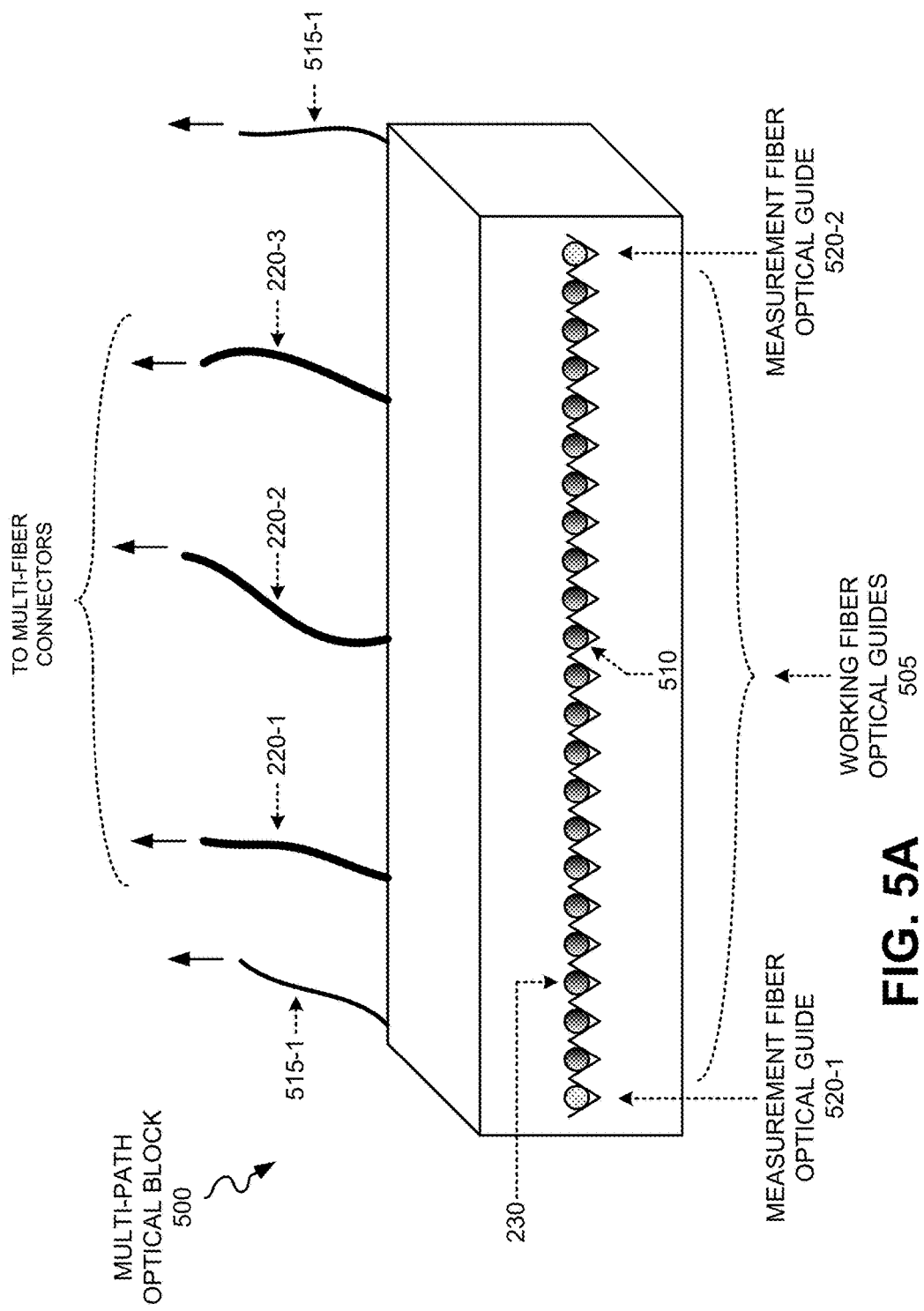
FIGS. 5A and 5B are diagrams that depict a multi-path optical block that is a movable component of the multi-path optical switch of FIG. 1A and that uses accurate fiber alignment technology for aligning fiber tips of adjacent optical blocks.
Figure 5B:
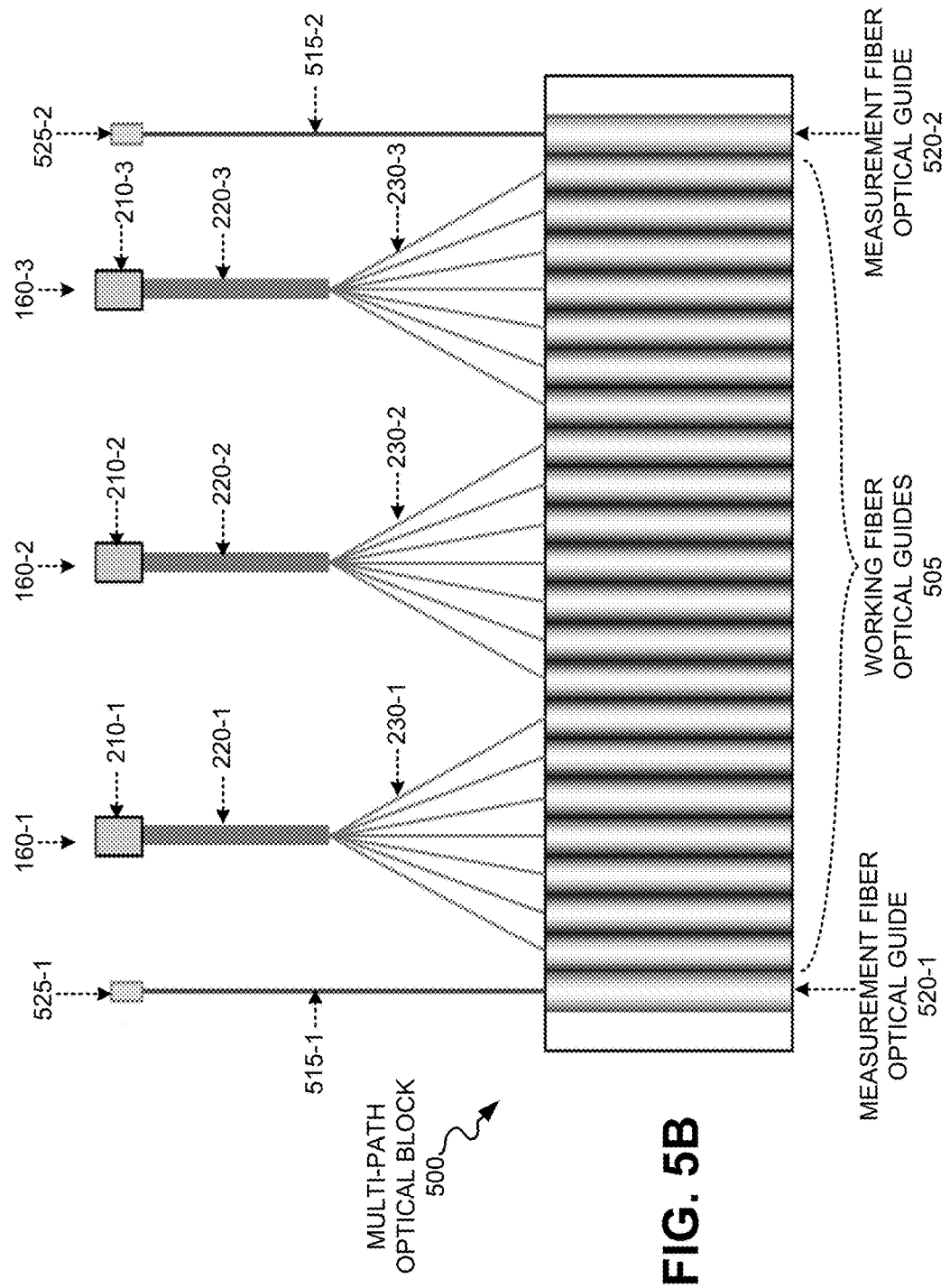

FIGS. 5A and 5B depict a multi-path optical block 500 that is a movable component of multi-path optical switch 120 and which, as will be described in further detail below, uses accurate fiber alignment mechanisms for aligning fiber tips of adjacent optical blocks. Multi-path optical block 500, when used in optical switch 120 as described further below, enables multiple optical fibers to be simultaneously switched from a first path from switch fabric cards 110 to fan-out panel stack 125 to a second path from switch fabric cards 110 to fan-out panel stack 125.

Multi-path optical block 500 includes a rectangular structure into which multiple optical fibers are inserted within an array of optical guides. For example, as shown in FIG. 5B, individual fibers 230-1, 230-2 and 230-3 of multi-fiber connector assemblies 160-1, 160-2 and 160-3 are inserted into working fiber optical guides 505 of multi-path optical block 500. As further shown in the exemplary implementation of FIGS. 5A and/or 5B, where the optical guides include V-groove optical fiber guides, each of the individual fibers 230 may be inserted into a respective V-groove optical fiber guide 510. A linear array of V-groove optical fiber guides 510 is depicted in FIGS. 5A and 5B, with each V-groove optical fiber guide 510 of fiber optical guides 505 being configured in parallel with one another in the linear array within block 500.

As further shown in FIGS. 5A and 5B, an individual measurement fiber 515-1 and 515-2 may be inserted into measurement fiber optical guides 520-1 and 520-2 at each end of working fiber optical guides 505. Measurement fiber 515-1 may include a fiber connector 525-1, and measurement fiber 515-2 may include a fiber connector 525-2, for connecting to a light source (not shown) or a light detector (not shown). The use of measurement fibers 515-1 and 515-2 is described below with respect to FIG. 10.

FIGS. 6A and 6B depict further details of an individual V-groove optical fiber guide 510 of multi-path optical block 500. As shown, an individual fiber 230 is inserted into a V-groove optical fiber guide 510 formed within a substrate 600. Substrate 600 may include various different materials, such as, for example, silicon. In one implementation, a micro-clamp 610 may be affixed to substrate 600 over fiber 230 to securely hold fiber 230 within V-groove optical fiber guide 510. The V-groove optical fiber guide 510 of FIGS. 6A and 6B may be replicated in a parallel array (e.g., linear array) of V-groove optical fiber guides 510 having precise locations with respect to one another, as shown in FIGS. 5A and 5B.

Figure 7A:
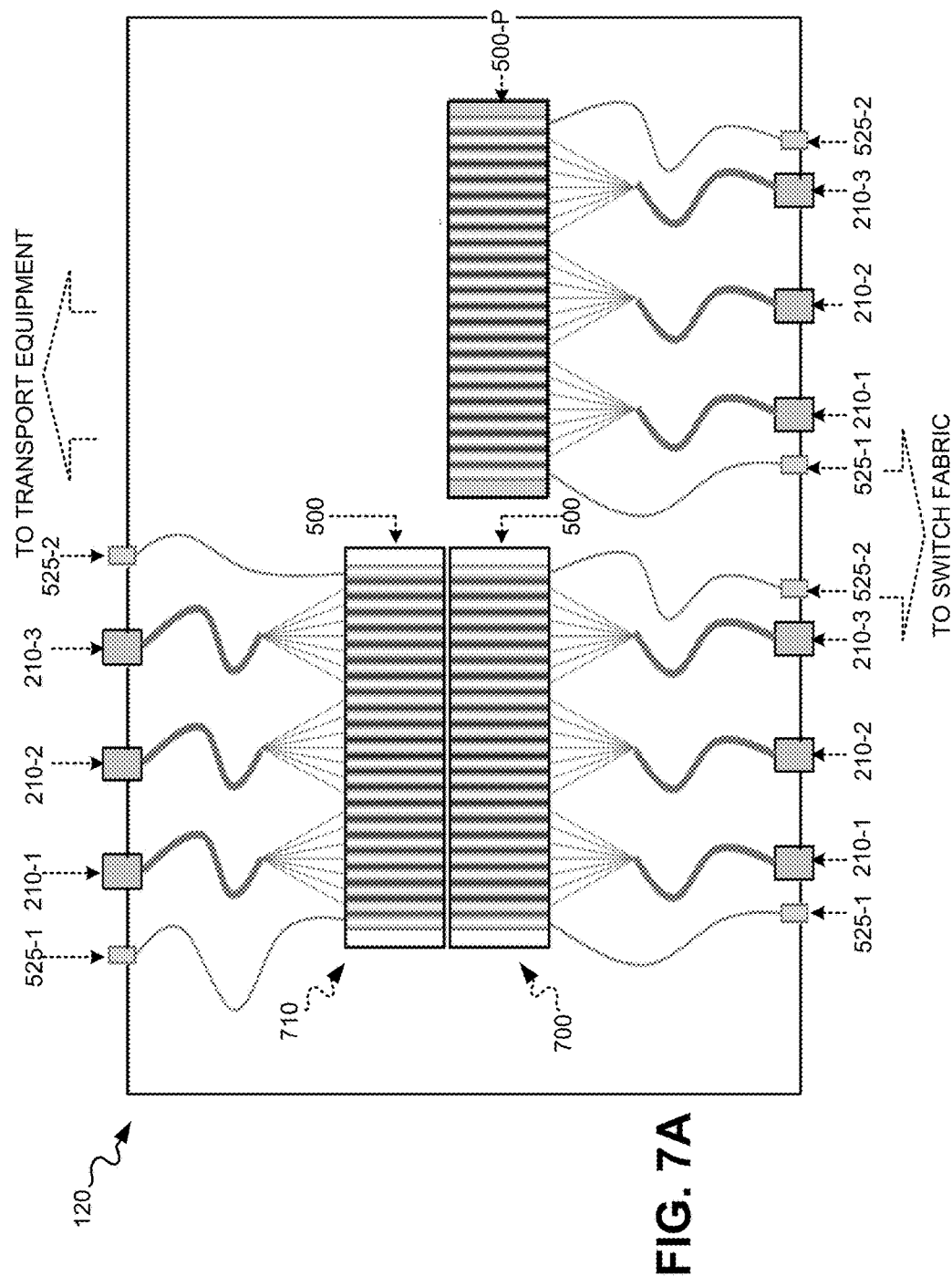
FIG. 7A is a diagram that depicts a side view of internal components of the multi-path optical switch of FIG. 1A.

FIGS. 7A and 7B depict internal details of multi-path optical switch 120. FIG. 7A depicts a top view of multi-path optical switch 120, and FIG. 7B depicts a side view of multi-path optical switch 120, including the movement of the optical blocks 500 within switch 120. As shown, multi-path optical switch 120 includes at least two stacks of optical blocks 500, with stack 700 (stack 1) abutting stack 710 (stack 2) such that the fiber tips of the individual optical fibers 230 of blocks 500 in stack 700 are aligned with the fiber tips of the individual optical fibers 230 of blocks 500 in stack 710. In other words, each fiber tip of fibers 230 in stack 700 is aligned with its counterpart fiber tip in stack 710. Each optical block 500 in stacks 700 and 710 may be configured as depicted in FIGS. 5A and 5B.

As shown in FIG. 7B, the optical blocks 500 of stack 1 700 are disposed one above another in the order, from bottom to top, of block $500\text{-}1^{S1}$, $500\text{-}2^{S1}$, $500\text{-}3^{S1}$, $500\text{-}4^{S1}$ and $500\text{-}5^{S1}$. As also depicted in FIG. 7B, each of optical blocks $500\text{-}1^{S1}$, $500\text{-}2^{S1}$, $500\text{-}3^{S1}$, $500\text{-}4^{S1}$ and $500\text{-}5^{S1}$ move horizontally (i.e., left and right in FIG. 7B) such that the back face of the blocks is moved to abut a corresponding block of stack 2 710, or moved such that the back face no longer abuts the corresponding block of stack 2 710. For purposes of simplicity, the supporting structure within optical switch 120 that supports $500\text{-}1^{S1}$, $500\text{-}2^{S1}$, $500\text{-}3^{S1}$, $500\text{-}4^{S1}$ and $500\text{-}5^{S1}$ and in which the blocks 500 move horizontally is not shown. Mechanical macro-positioning mechanisms (not shown) may be used for moving each block 500 of stack 1 700 horizontally (i.e., right or left).

As further shown in FIG. 7B, the optical blocks 500 of stack 2 710 are disposed one above another in the order, from bottom to top, of block $500\text{-}1^{S2}$, $500\text{-}2^{S2}$, $500\text{-}3^{S2}$, $500\text{-}4^{S2}$ and $500\text{-}5^{S2}$. Though not shown in FIG. 7B, a position of each of optical blocks $500\text{-}1^{S2}$, $500\text{-}2^{S2}$, $500\text{-}3^{S2}$, $500\text{-}4^{S2}$ and $500\text{-}5^{S2}$ within stack 2 710 may be finely adjusted, using mechanical micro-positioning mechanisms, to precisely align the fiber tips of the individual optical fibers 230 of blocks 500 in stack 700 with the fiber tips of the individual optical fibers 230 of blocks 500 in stack 710. An exemplary implementation of the micro-positioning mechanisms is described below with respect to FIG. 9. For purposes of simplicity, the supporting structure that supports $500\text{-}1^{S2}$, $500\text{-}2^{S2}$, $500\text{-}3^{S2}$, $500\text{-}4^{S2}$ and $500\text{-}5^{S2}$ is not shown.

FIG. 7B further depicts protection optical block 500-P that is disposed adjacent to stack 1 700 within optical switch 120. Mechanical macro-positioning mechanisms (not shown) may move protection optical block 500-P vertically (i.e., up and down) and/or horizontally (i.e., right and left) within optical switch 120, from an initial position (identified by a "1" within a circle), so as to move into a position (identified by a "A" within a circle) within stack 1 700 vacated by one of optical blocks $500\text{-}1^{S1}$, $500\text{-}2^{S1}$, $500\text{-}3^{S1}$, $500\text{-}4^{S1}$ and $500\text{-}5^{S1}$ that has been moved leftwards out of stack 1 700 such that the optical block 500 that has moved leftwards no longer abuts the corresponding optical block 500 of stack 2 710. Movement of optical blocks within stack 1 700, and movement of protection optical block 500-P is described in further detail below with respect to FIG. 8.

Returning to FIG. 7A, the optical blocks 500 of stack 2 710 include fiber connections on a face of optical switch 120 that faces towards external transport equipment. As shown in FIG. 7A, each optical block 500 of stack 2 710 includes multi-fiber connectors 210-1, 210-2 and 210-3 of respective multi-fiber connector assemblies 160-1, 160-2 and 160-3 inserted through the face of optical switch 120 facing towards the transport equipment. Each optical block 500 of stack 2 710 further includes a measurement fiber connector 525-1 and 525-2 inserted through the face of optical switch 120 facing towards the transport equipment. The use of measurement fiber connectors 525-1 and 525-2 is described further below with respect to FIG. 10.

As further shown in FIG. 7A, each optical block 500 of stack 1 700 includes multi-fiber connectors 210-1, 210-2 and 210-3 of respective multi-fiber connector assemblies 160-1, 160-2 and 160-3 inserted through the face of optical switch 120 facing towards the switch fabric (e.g., to working cards 135 of switch fabric cards 110). Each optical block 500 of stack 1 700 further includes a measurement fiber connector 525-1 and 525-2 inserted through the face of optical switch 120 facing towards the switch fabric. The use of measurement fiber connectors 525-1 and 525-2 is described further below with respect to FIG. 10.

As additionally shown in FIG. 7A, protection optical block 500-P also includes multi-fiber connectors 210-1, 210-2 and 210-3 of respective multi-fiber connector assemblies 160-1, 160-2 and 160-3 inserted through the face of optical switch 120 facing towards the switch fabric (e.g., to protection card 140 of switch fabric cards 110). Protection optical block 500-P further includes a measurement fiber connector 525-1 and 525-2 inserted through the face of optical switch 120 facing towards the switch fabric. The use of measurement fiber connectors 525-1 and 525-2 is described further below with respect to FIG. 10.

Figure 8:
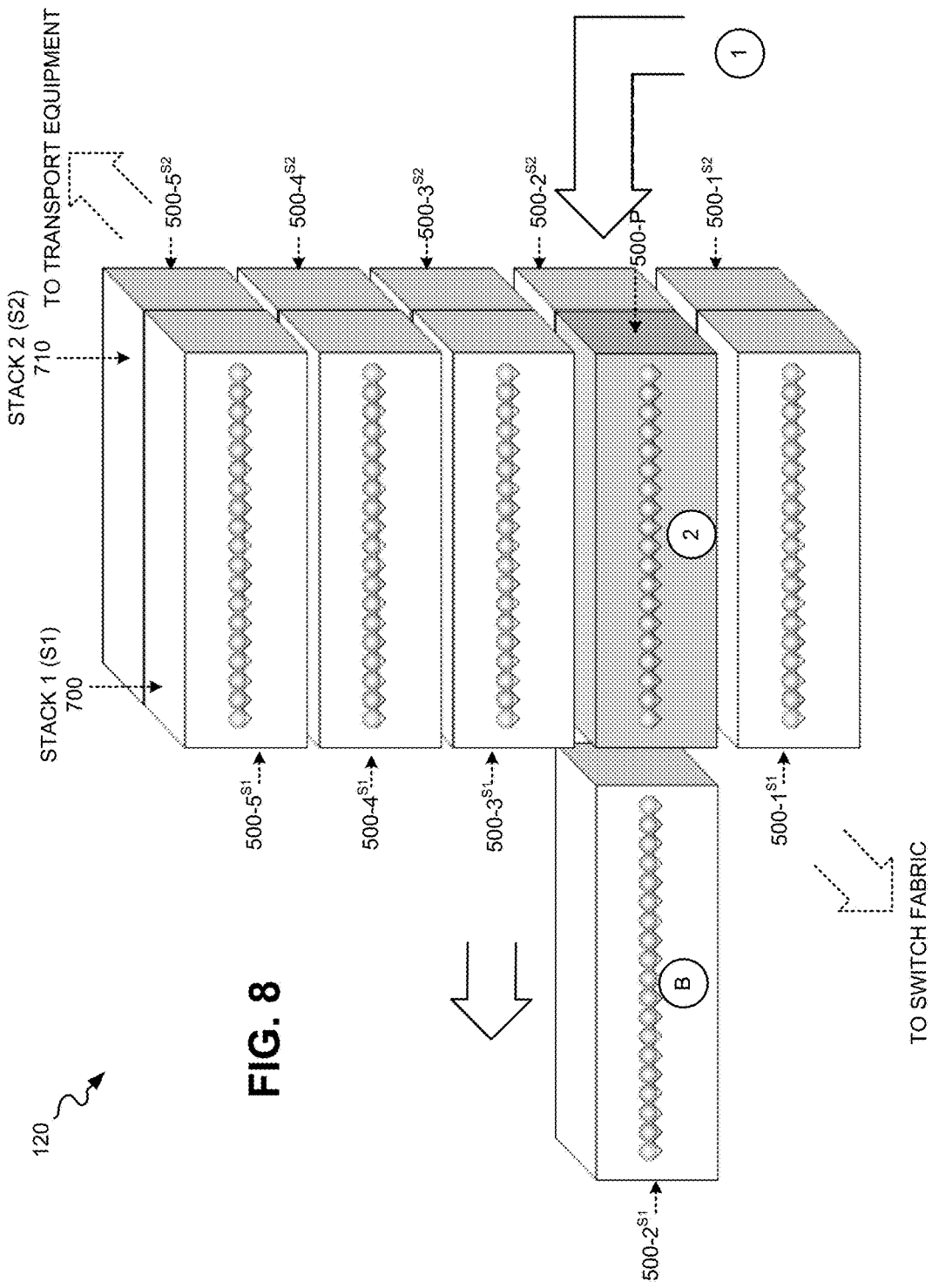
FIG. 8 is a diagram that depicts switching of the multi-path optical switch of FIG. 1A via movement of a protection optical block into, or out of, a stack of optical blocks.

FIG. 8 depicts switching paths within optical switch 120 via movement of protection block 500-P into, or out of, stack 1 700. As shown in FIG. 8, one of optical blocks $500\text{-}1^{S1}$, $500\text{-}2^{S1}$, $500\text{-}3^{S1}$, $500\text{-}4^{S1}$ and $500\text{-}5^{S1}$ is moved horizontally (i.e., leftward in a linear movement in FIG. 8) such that the back face of the moved optical block 500 no longer abuts a face of a corresponding one of optical blocks $500\text{-}1^{S2}$, $500\text{-}2^{S2}$, $500\text{-}3^{S2}$, $500\text{-}4^{S2}$ and $500\text{-}5^{S2}$. For example, as shown in FIG. 8, optical block $500\text{-}2^{S1}$ is moved horizontally (to the position identified by a "B" within a circle) such that the back face of optical block $500\text{-}2^{S1}$ no longer abuts a front face of optical block $500\text{-}2^{S2}$. Protection optical block 500-P is then moved (from the position identified by a "1" within a circle) into the position within stack 1 700 formerly occupied by $500\text{-}2^{S1}$ such that a back face of protection optical block 500-P abuts the front face of optical block $500\text{-}2^{S2}$ (to the position identified by a "2" within a circle in stack 1 700). The fiber tips of the individual fibers 230 inserted within the optical guides 505 may then be precisely aligned as described with respect to FIG. 10 below. Protection optical block 500-P may similarly be moved to occupy the former position of any one of optical blocks $500\text{-}1^{S1}$, $500\text{-}3^{S1}$, $500\text{-}4^{S1}$ or $500\text{-}5^{S1}$ in stack 1 700. Upon precise alignment of the optical fibers of protection optical block 500-P and the optical block 500 of stack 1 700, data may be switched (as described with respect to FIG. 4 above) from a working card 135, through backplane interface 145, through protection card 140 and through optical switch 120 via protection optical block 500-P.

Figure 9:
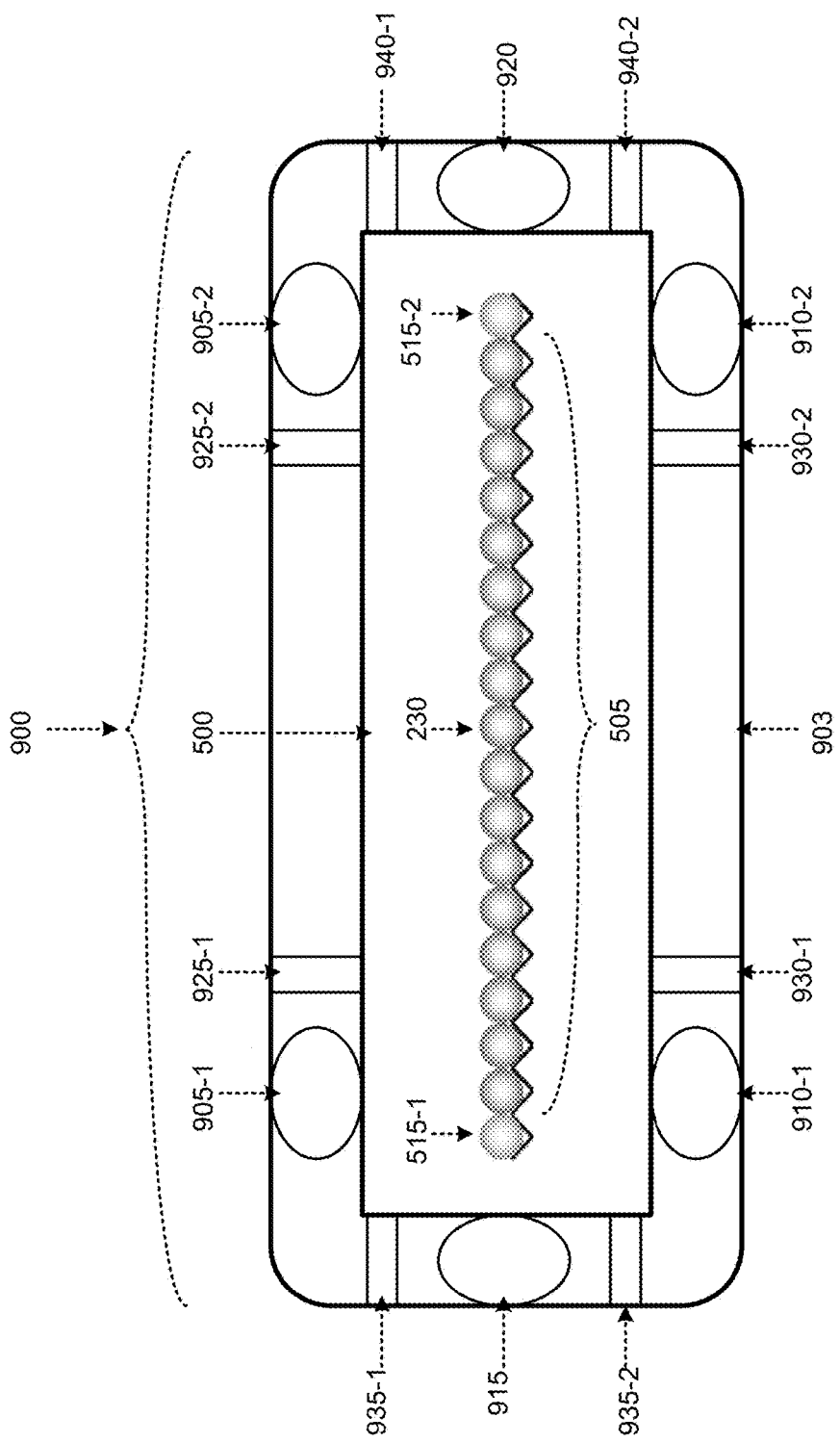
FIG. 9 is a diagram that depicts micro-positioning mechanisms associated with each optical block of the second stack of optical blocks of the multi-path optical switch of FIGS. 7A and 7B

FIG. 9 depicts micro-positioning mechanisms 900 associated with each optical block 500 of stack 2 710 of optical switch 120. In other implementations, micro-positioning mechanisms 900 may be associated with each optical block 500 of both stack 1 700 and stack 2 710 of optical switch 120. For aligning the fiber tips of individual fibers 230 of optical block 500 of stack 2 710 with the fiber tips of individual fibers 230 of an optical block 500 of stack 1 700, position adjusters (905-1, 905-2, 910-1, 910-2, 915 and 920 discussed below) are disposed between the sides (i.e., faces) of optical block 500 and the inner sides of a socket 903. Optical block 500 is inserted into socket 903 such that the position adjusters touch each side (i.e., face) of optical block 500, not including the side of block 500 into which optical fibers are inserted or the side of block 500 from which the fiber tips of the optical fibers align with fiber tips of an optical block 500 of stack 1 700.

In the exemplary implementation of FIG. 9, position adjusters 905-1 and 905-2 are connected between an upper inner surface of socket 903 and the upper side (face) of optical block 500, position adjuster 915 is connected between a left inner side of socket 903 and a left side (face) of optical block 500, position adjuster 920 is connected between a right inner side of socket 903 and a right side (face) of optical block 500, and position adjusters 910-1 and 910-2 are connected between a lower inner surface of socket 903 and the lower side (face) of optical block 500. Position adjusters 905-1 and 905-2, and position adjusters 910-1 and 910-2, may cause optical block 500 to move upwards or downwards within socket 903 to finely tune the vertical position of optical block 500 within socket 903 and with respect to the abutting optical block 500 of stack 1 700. Position adjusters 905-1 and 905-2, and 910-1 and 910-2, may work in conjunction with one another to move optical block 500 upwards or downwards within socket 903. Position adjusters 915 and 920 may cause optical block 500 to move left or right within socket 903 to finely tune the horizontal position of optical block 500 within socket 903 and with respect to the abutting optical block 500 of stack 1 700. In one implementation, each of position adjusters 905-1, 905-2, 910-1, 910-2, 915 and 920 may include piezoelectric transducers that are controlled by the control unit (not shown) of transport node 100.

Once the position of optical block 500 within socket 903 has been finely tuned (e.g., to align optical fibers as described with respect to FIG. 10 below), position lockers, which are connected between the inner surfaces of socket 903 and the outer sides (faces) of optical block 500 may be actuated to lock optical block 500 within a certain position within socket 903. As shown in the exemplary implementation of FIG. 9, position lockers 925-1 and 925-2 are connected between an upper inner surface of socket 903 and the upper side (face) of optical block 500, position lockers 935-1 and 935-2 are connected between a left inner side of socket 903 and a left side (face) of optical block 500, position lockers 940-1 and 940-2 are connected between a right inner side of socket 903 and a right side (face) of optical block 500, and position lockers 930-1 and 930-2 are connected between a lower inner surface of socket 903 and the lower side (face) of optical block 500.

Position lockers 925-1, 925-2, 930-1 and 930-2, when actuated, work in conjunction with one another to lock optical block 500 in a certain vertical position within socket 903 and relative to the abutting optical block 500 of stack 1 700. Position lockers 935-1, 935-2, 940-1 and 940-2, when actuated, work in conjunction with one another to lock optical block 500 in a certain horizontal position within socket 903 and relative to the abutting optical block 500 of stack 1 700. In one implementation, each of position lockers 925-1, 925-2, 930-1, 930-2, 935-1, 935-2, 940-1 and 940-2 may include a micro-electromechanical system (MEMS) that includes mechanisms for locking a position of optical block 500 relative to socket 903. Position lockers 925-1, 925-2, 930-1, 930-2, 935-1, 935-2, 940-1 and 940-2 may be controlled by the control unit of transport node 100.

Figure 10:
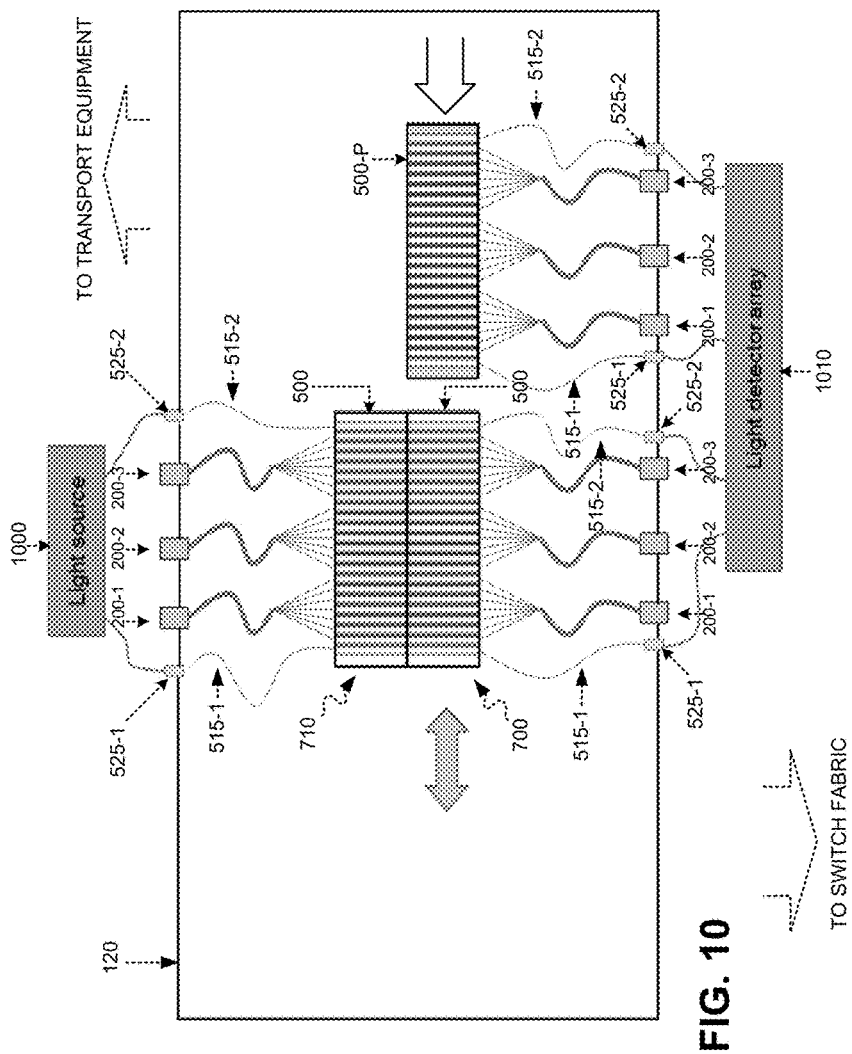
FIG. 10 depicts the use of a light source and a light detector array for adjusting the position of an optical block using the micro-positioning mechanisms of FIG. 9.

FIG. 10 depicts the use of light source 1000 and light detector array 1010 for adjusting the position of an optical block 500 of stack 2 710, using micro-positioning mechanisms 900, so as to accurately align the fiber tips of optical block 500 of stack 2 710 with their counterpart fiber tips in an optical block 500 of stack 1 700, or with fiber tips in protection optical block 500-P when block 500-P has been moved into a position previously held by an optical block 500 of stack 1 700.

To align the fiber tips of individual optical fibers 230, a control unit (not shown) of transport node 100 causes light source 1000 to emit light of a specific wavelength and duration. The light travels through measurement fiber connectors 525-1 and 525-2, measurement fibers 515-1 and 515-2, and measurement fiber optical guides 520-1 and 520-2 (not visible in this FIG.) of the optical block 500 of stack 2 710. When optical block 500 of stack 2 710 is approximately aligned with a corresponding optical block 500 of stack 1 700, or approximately aligned with protection block 500-P (which has been moved into the position of the optical block 500 of stack 1 700), the light continues to travel through measurement fiber optical guides 520-1 and 520-2 of (not visible in this FIG.) the optical block 500 of stack 1 700 (or protection block 500-P), through measurement fibers 515-1 and 515-2, and out through measurement fiber connectors 525-1 and 525-2 to light detector array 1010. The control unit controls micro-positioning mechanisms 900 to finely adjust the position of optical block 500 within stack 2 710 relative to the abutting optical block 500 of stack 1 710 (or protection optical block 500-P) to maximize the optical transmission and minimize the power loss of the light emitted from light source 1000 and received at light detector array 1010. The control unit adjusts micro-positioning mechanisms 900 until maximum optical transmission, and minimum power loss, is achieved as measured at light detector array 1010. At that time, the control unit causes the position lockers within socket 903 to actuate, locking optical block 500 of stack 2 710 into the position of maximum optical transmission and minimum power loss. For example, referring to the implementation of FIG. 9, the control unit (not shown) may finely adjust the vertical position of optical block 500 by controlling position adjusters 905-1, 905-2, 910-1 and 910-2. The control unit may also finely adjust the horizontal position of optical block 500 by controlling position adjusters 915 and 920. When the position of optical block 500 is reached that achieves maximum optical transmission and minimum power loss between light source 1000 and light detector array 1010, then the control unit may actuate position lockers 925-1, 925-2, 930-1, 930-2, 935-1, 935-2, 940-1 and 940-2 to lock optical block 500 into the position.

Figure 11A:
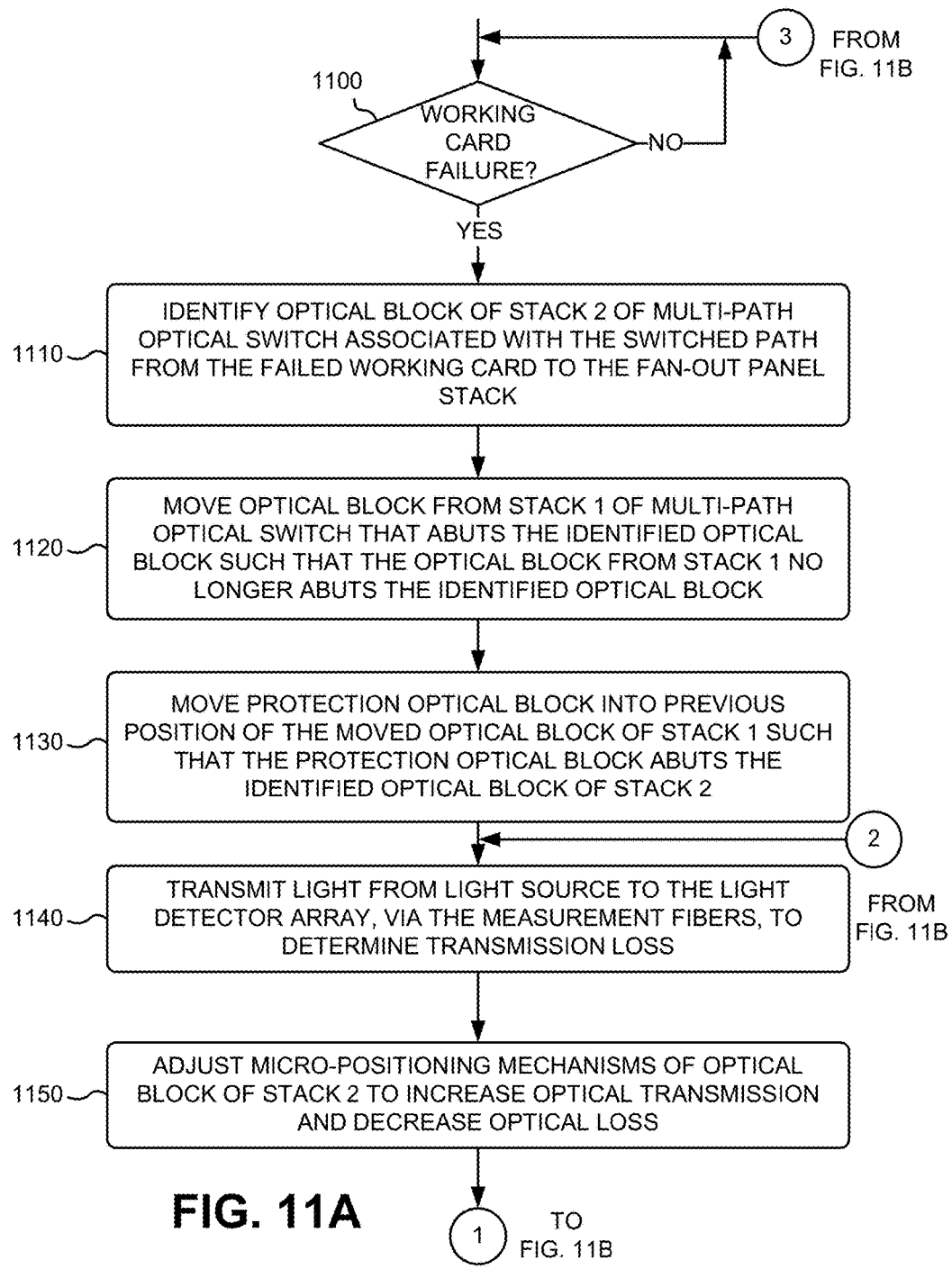
FIGS. 11A and 11B are flow diagrams of an exemplary process for switching optical signals via the multi-path optical switch of FIG. 1A when one of the working cards of the switch fabric cards fails.
Figure 11B:
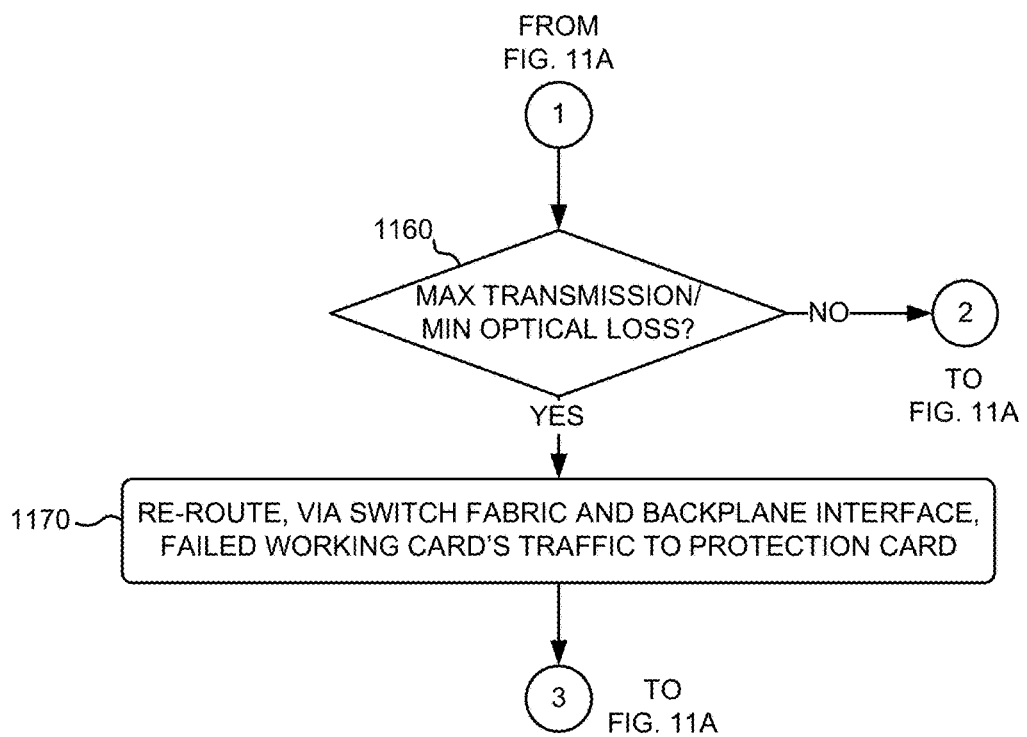

FIGS. 11A and 11B are flow diagrams of an exemplary process for switching optical signals via multi-path optical switch 120 when one of the working cards 135 of switch fabric cards 110 fails. The exemplary process of FIGS. 11A and 11B may be implemented by transport node 100.

The exemplary process may include determining if a failure in one of the working cards 135 of transport node 100 has occurred (block 1100). Any component of working cards 135 of switch fabric cards 110 may fail. For example, photonic IC 155 or multi-fiber connector assembly 160 may fail. If a working card failure has occurred (YES—block 1100), then transport node 100 identifies an optical block 500 of stack 2 710 of multi-path optical switch 120 associated with the switched path from the failed working card to the fan-out panel stack 125 (block 1110). Referring to FIG. 3, the control unit identifies the current path (PATH 1) through 120, including, as depicted in FIG. 7B, a path through a block 500 of stack 1 700 and a block 500 of stack 2 710. For example, referring to FIG. 7B, the current path (PATH 1) may extend from one of working cards 135 to block 500-2$^{S1}$ of stack 1 700 through abutting block 500-2$^{S2}$ of stack 2 710 to fan-out panel stack 125. The control unit identifies block 500-2$^{S2}$ of stack 2 710 as being associated with the current switched path through optical switch 120.

Transport node 100 moves an optical block 500 from stack 1 700 of multi-path optical switch 120 that abuts the identified optical block of block 1110 such that the optical block 500 from stack 1 700 no longer abuts the identified optical block (block 1120). Referring to the example above, in which block 500-2$^{S2}$ of stack 2 710 has been identified as being associated with the current switched path through optical switch 120, the control unit moves block 500-2$^{S1}$ of stack 1 700 that abuts block 500-2$^{S2}$ of stack 2 710. The control unit moves block 500-2$^{S1}$ of stack 1 700 leftward (see FIG. 8) such that the rear surface (face) of block 500-2$^{S1}$ no longer abuts the front surface (face) of block 500-2$^{S2}$ of stack 2 710.

Transport node 100 moves protection optical block 500-P into the previous position of the moved optical block 500 of stack 1 700 such that the protection optical block 500-P abuts the optical block of stack 2 identified in block 1110 (block 1130). Referring to FIG. 7B, protection block 500-P may initially be located in a position to the right of stack 1 700. After the optical block 500 has been moved in stack 1 700, protection block 500-P may be moved into the position in stack 1 700 previously held by the moved optical block. For example, referring to the example of FIG. 8, once block 500-2$^{S1}$ of stack 1 700 is moved leftward, protection block 500-P is moved upwards and leftwards to hold the position in stack 1 700 previously held by block 500-2$^{S1}$.

Transport node 100 transmits light from light source 1000 to light detector array 1010, via the measurement fibers 515-1 and 515-2, to determine the transmission loss across abutting optical blocks in stack 1 700 and stack 2 710 of multi-path optical switch 120 (block 1140). The control unit of transport node 100 causes light source 1000 to transmit light to light detector array 1010, as shown in FIG. 10, via a measurement path that includes light source 1000, fiber connector 525, fiber 515, fiber optical guide 520 (not visible in this FIG.) of optical block 500 of stack 2 710, fiber optical guide 520 (not visible in this FIG.) of protection optical block 500-P relocated into stack 1 700, fiber 515, fiber connector 525, and light detector array 1010. The control unit, based on the known light emitted from light source 1000, and the measured light received at light detector array 1010, can determine the optical transmission loss along the current path between blocks of the two stacks 700 and 710. The optical transmission loss is indicative of the proper positioning of a block 500 in stack 1 700 with the abutting block 500 (e.g., protection block 500-P in the present example) in stack 2 710. For example, if block 500 in stack 1 700 is not accurately aligned with block 500 in stack 2 710 (e.g., protection block 500-P), then a higher level of optical transmission loss will be measured at light detector array 1010 than when block 500 in stack 1 700 is more accurately aligned with block 500 in stack 2 710. Transport node 100 adjusts micro-positioning mechanisms 900 of the optical block of stack 2 710 to increase optical transmission and decrease the optical loss (block 1150). The control unit of transport node 100 adjusts one or more of position adjusters 905-1, 905-2, 915, 920, 910-1 and 910-2 to increase the optical transmission and decrease the optical loss from light source 1000 and light detector array 1010.

Transport node 100 determines if a maximum optical transmission and minimum optical loss has been achieved from light source 1000 to light detector array 1010 across the abutting optical blocks in stack 1 700 and stack 2 710 (i.e., through protection block 500-P currently located in stack 1 700) of optical switch 120 (block 1160). If maximum optical transmission and minimum optical loss has not been achieved (NO—block 1160), then the exemplary process may return to block 1140 with further adjustment of the position of optical block 500 of stack 2 710 of optical switch 120. Blocks 1140, 1150 and 1160 may iteratively repeat until the control unit of transport node 100 determines that the current positions of position adjusters 905-1, 905-2, 915, 920, 910-1 and 910-2 of block 500 in stack 2 710 maximizes the optical transmission and minimizes the optical loss. When the maximum optical transmission and minimum optical loss is achieved, the fiber tips of the fibers 230 inserted into the optical block 500 of stack 2 710 should be precisely aligned with the fiber tips of the fibers 230 inserted into the optical block 500 of stack 1 700 (i.e., into protection block 500-P currently located in stack 1 700).

If a maximum optical transmission and minimum optical loss has been achieved by adjusting micro-positioning mechanism 900 (YES—block 1160), then transport node 100 may re-route, via switch fabric 150 and backplane interface 145, the failed working card's traffic to protection card 140 (block 1170). Referring again to FIG. 4, the traffic may be re-routed from a failed working card 135, through backplane interface 145 to protection card 140. Protection card 140 converts the traffic to optical signals and sends those signals through optical switch 120 via the backup protection path that includes protection block 500-P established in blocks 1110, 1120 and 1130. Traffic originally handled by the failed working card may continue to be re-routed through protection card 140 and protection block 500-P until the failed working card is repaired or replaced. When the failed working card has been repaired or replaced, the optical block 500 of stack 1 700 moved in block 1120 can be returned to its position within stack 1 700, and protection block 500-P can be moved out of stack 1 700 to its "standby" position (see FIG. 7B).

The foregoing description of implementations provides illustration and description, but is not intended to be exhaustive or to limit the invention to the precise form disclosed. Modifications and variations are possible in light of the above teachings or may be acquired from practice of the invention. While a series of blocks has been described with respect to FIGS. 11A and 11B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An optical path system, comprising:
   a first block comprising a first plurality of fiber optic guides, arranged in a first configuration to receive a first plurality of optical fibers;
   a second block comprising a second plurality of fiber optic guides, arranged in a second configuration to receive a second plurality of optical fibers, wherein a first face of the second block abuts a first face of the first block and wherein the first block is movable relative to the second block; and
   a plurality of micro-position adjusting mechanisms configured to move the first block relative to the second block to align the first plurality of optical fibers with the second plurality of optical fibers, wherein one of the plurality of micro-position adjusting mechanisms is configured to move the first block relative to the second block to produce a sub-micron alignment between the first plurality of optical fibers and the second plurality of optical fibers; and
   a plurality of macro-position adjusting mechanisms wherein one of the plurality of macro-positioning adjusting mechanisms is configured to move the second block horizontally such that the first face of the second block no longer abuts the first face of the first block.

2. The optical path system of claim 1, further comprising:
   a third block comprising a third plurality of fiber optic guides, arranged in the first configuration to receive a third plurality of optical fibers, wherein a first face of the third block is parallel to the first face of the second block,
   wherein the plurality of macro-position adjusting mechanisms are further configured to move the third block at least one of horizontally or vertically such that a first face of the third block abuts the first face of the first block.

3. The optical path system of claim 1, further comprising:
   a first light source coupled to a first optical fiber placed within a first fiber optic guide of the first plurality of fiber optic guides of the first block; and
   a first light detector coupled to a second optical fiber placed within a second fiber optic guide of the second plurality of fiber optic guides of the second block,
   wherein when the first face of the second block abuts the first face of the first block, one of the plurality of micro-position adjusting mechanisms is configured to move the first block relative to the second block to align the first optical fiber within the first fiber optic guide of the first block with the second optical fiber within the second fiber optic guide of the second block to maximize optical transmission between the first optical fiber and the second optical fiber.

4. The optical path system of claim 1, further comprising:
   a third block comprising a third plurality of fiber optic guides, arranged in a first configuration to receive a third plurality of optical fibers, wherein the third block is positioned on top of the first block such that the third plurality of optical fibers lie parallel to the first plurality of optical fibers; and
   a fourth block comprising a fourth plurality of fiber optical guides, arranged in the first configuration to receive a fourth plurality of optical fibers, wherein a first face of the fourth block abuts a first face of the third block, wherein the fourth block is movable relative to the third block, and wherein the fourth block is positioned on top of the second block such that the third plurality of optical fibers lie parallel to the second plurality of optical fibers.

5. The optical path system of claim 4, wherein one of the plurality of macro-position adjusting mechanisms is further configured to move the fourth block horizontally such that the first face of the fourth block no longer abuts the first face of the third block.

6. The optical path system of claim 5, further comprising:
   a fifth block comprising a fifth plurality of fiber optic guides, arranged in the first configuration to receive a fifth plurality of optical fibers, wherein a first face of the fifth block is parallel to the first face of the second block,
   wherein the plurality of macro-position adjusting mechanisms are further configured to move the fifth block at least one of horizontally or vertically such that a second face of the fifth block abuts the first face of the first block.

7. The optical path system of claim 5, further comprising:
   a fifth block comprising a fifth plurality of fiber optic guides, arranged in the first configuration to receive a fifth plurality of optical fibers, wherein a first face of the fifth block is parallel to the first face of the second block,
   wherein the plurality of macro-position adjusting mechanisms are further configured to move the fifth block at least one of horizontally or vertically such that the second face of the fifth block abuts the first face of the third block.

8. The optical path system of claim 1, wherein the first plurality of fiber optic guides comprise a first plurality of V-grooves disposed in a substrate, and wherein the first configuration comprises the first plurality of V-grooves arranged linearly within the substrate with each of the V-grooves lying parallel to one another.

9. An optical path system, comprising:
   a first block comprising a first plurality of fiber optic guides, arranged in a first configuration to receive a first plurality of optical fibers;
   a second block comprising a second plurality of fiber optic guides, arranged in a second configuration to receive a second plurality of optical fibers, wherein a first face of the second block abuts a first face of the first block and wherein the first block is movable relative to the second block; and
   a micro-position adjusting mechanism configured to move the first block relative to the second block to align the first plurality of optical fibers with the second plurality of optical fibers, wherein the micro-position adjusting mechanism is configured to move the first block relative to the second block to produce a submicron alignment between the first plurality of optical fibers and the second plurality of optical fibers and wherein the micro-position adjusting mechanism comprises at least one piezoelectric transducer.

10. The optical path system of claim 9, further comprising:
a third block comprising a third plurality of fiber optic guides, arranged in the first configuration to receive a third plurality of optical fibers, wherein a first face of the third block is parallel to the first face of the second block,
a macro-position adjusting mechanism configured to:
move the second block horizontally such that the first face of the second block no longer abuts the first face of the first block, and
move the third block at least one of horizontally or vertically such that a first face of the third block abuts the first face of the first block.

11. The optical path system of claim 9, further comprising:
a first light source coupled to a first optical fiber placed within a first fiber optic guide of the first plurality of fiber optic guides of the first block; and
a first light detector coupled to a second optical fiber placed within a second fiber optic guide of the second plurality of fiber optic guides of the second block,
wherein when the first face of the second block abuts the first face of the first block, the micro-position adjusting mechanism is configured to move the first block relative to the second block to align the first optical fiber within the first fiber optic guide of the first block with the second optical fiber within the second fiber optic guide of the second block to maximize optical transmission between the first optical fiber and the second optical fiber.

12. The optical path system of claim 9, further comprising:
a third block comprising a third plurality of fiber optic guides, arranged in the first configuration to receive a third plurality of optical fibers, wherein the third block is positioned on top of the first block such that the third plurality of optical fibers lie parallel to the first plurality of optical fibers; and
a fourth block comprising a fourth plurality of fiber optical guides, arranged in the first configuration to receive a fourth plurality of optical fibers, wherein a first face of the fourth block abuts a first face of the third block, wherein the fourth block is movable relative to the third block, and wherein the fourth block is positioned on top of the second block such that the third plurality of optical fibers lie parallel to the second plurality of optical fibers.

13. The optical path system of claim 12, further comprising:
a macro-position adjusting mechanism configured to move the fourth block horizontally such that the first face of the fourth block no longer abuts the first face of the third block.

14. The optical path system of claim 13, further comprising:
a fifth block comprising a fifth plurality of fiber optic guides, arranged in the first configuration to receive a fifth plurality of optical fibers, wherein a first face of the fifth block is parallel to the first face of the second block,
wherein the macro-position adjusting mechanism is further configured to move the fifth block horizontally and vertically such that a second face of the fifth block abuts the first face of the first block.

15. The optical path system of claim 13, further comprising:
a fifth block comprising a fifth plurality of fiber optic guides, arranged in the first configuration to receive a fifth plurality of optical fibers, wherein a first face of the fifth block is parallel to the first face of the second block,
wherein the macro-position adjusting mechanism is further configured to move the fifth block horizontally and vertically such that the second face of the fifth block abuts the first face of the third block.

16. The optical path system of claim 9, wherein the first plurality of fiber optic guides comprise a first plurality of V-grooves disposed in a substrate, and wherein the first configuration comprises the first plurality of V-grooves arranged linearly within the substrate with each of the V-grooves lying parallel to one another.

17. A structure, comprising:
a socket having four inner surfaces;
a first block comprising a first plurality of fiber optic guides, arranged in a first configuration to receive a first plurality of optical fibers, wherein the first block is placed within the socket and wherein four sides of the first block face outwards towards the inner surfaces of the socket;
a first position adjuster connected between a first one of the four sides of the first block and a first one of the inner surfaces of the socket, wherein the first position adjuster is configured to adjust a position of the first block in a first dimension; and
a second position adjuster connected between a second one of the four sides of the first block and a second one of the inner surfaces of the socket, wherein the second position adjuster is configured to adjust the position of the first block in a second dimension, wherein the second dimension is different than the first dimension, and wherein the first position adjuster and the second position adjuster each comprises a piezoelectric transducer.

18. The structure of claim 17, wherein the first plurality of fiber optic guides comprise a first plurality of V-grooves disposed in a substrate, and wherein the first configuration comprises the first plurality of V-grooves arranged parallel to one another within the substrate.

19. The structure of claim 17, further comprising
a first position locker connected between the first one of the four sides of the first block and the first one of the inner surfaces of the socket, wherein the first position locker is configured to lock the first block in a first position in the first dimension; and
a second position locker connected between the second one of the four sides of the first block and the second one of the inner surfaces of the socket, wherein the second position locker is configured to lock the first block in a second position in the second dimension.

20. The structure of claim 17, further comprising:
a third position adjuster connected between a third one of the four sides of the first block and a third one of the inner surfaces of the socket, wherein the third position adjuster is configured to adjust a position of the first block in the first dimension in conjunction with the first position adjuster; and a fourth position adjuster connected between a fourth one of the four sides of the first block and a fourth one of the inner surfaces of the socket, wherein the fourth position adjuster is configured to adjust the position of the first block in the second dimension in conjunction with the second position adjuster.

\* \* \* \* \*